United States Patent
Zou

(10) Patent No.: US 7,944,928 B2
(45) Date of Patent: May 17, 2011

(54) METHOD AND APPARATUS FOR TRANSPORTING LOCAL AREA NETWORK SIGNALS IN OPTICAL TRANSPORT NETWORK

(75) Inventor: Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 797 days.

(21) Appl. No.: 11/955,640

(22) Filed: Dec. 13, 2007

(65) Prior Publication Data

US 2008/0124079 A1 May 29, 2008

Related U.S. Application Data

(63) Continuation of application No. PCT/CN2006/003577, filed on Dec. 25, 2006.

(30) Foreign Application Priority Data

Dec. 31, 2005 (CN) .......................... 2005 1 0137825

(51) Int. Cl.
*H04L 12/28* (2006.01)
*H04L 12/56* (2006.01)
*H04J 3/16* (2006.01)
*H04J 3/22* (2006.01)
*H04J 3/04* (2006.01)

(52) U.S. Cl. ...................... 370/395.5; 370/401; 370/466; 370/532; 370/535

(58) Field of Classification Search ............... 370/395.5, 370/395.53, 401, 466, 532, 535–544
See application file for complete search history.

(56) References Cited

U.S. PATENT DOCUMENTS

| | | | |
|---|---|---|---|
| 2003/0161344 A1 | 8/2003 | Maggi et al. | 370/466 |
| 2004/0205230 A1 | 10/2004 | Fontana et al. | 709/236 |
| 2007/0076769 A1 | 4/2007 | Zou | |
| 2008/0124079 A1 | 5/2008 | Zou | |

FOREIGN PATENT DOCUMENTS

| | | |
|---|---|---|
| CN | 1534952 A | 10/2004 |
| CN | 1734986 A | 2/2006 |
| CN | 100401715 A | 10/2006 |
| EP | 1 414 173 A2 | 4/2004 |
| EP | 1 742 494 A1 | 1/2007 |
| WO | WO 2005/036828 | 4/2005 |
| WO | WO-2005/099282 A1 | 10/2005 |

OTHER PUBLICATIONS

International Search Report for International Application No. PCT/CN2006/003577, dated Apr. 5, 2007.
Cheng, "Justification for the Support of Data Service Mapping in OTN using Lower Order ODU0; D 294," ITU-T Draft Study Period 2005-2008, International Telecommunication Union, pp. 1-5 (2005).
Vissers, "Definition of a New Transport Entity ODU0; D 92," ITU-T Draft Study Period 2005-2008, International Telecommunication Union, pp. 1-3 (2004).
European Search Report for Application No. EP 06 84 0628, dated Apr. 14, 2010.
International Preliminary Report on Patentability for Application No. PCT/CN2006/003577, dated Jul. 1, 2008.

*Primary Examiner* — Ronald Abelson

(74) *Attorney, Agent, or Firm* — Slater & Matsil, L.L.P.

(57) ABSTRACT

The method for transporting LAN signal in an OTN is provided by embodiments of the present invention includes mapping a LAN signal into an adaptation protocol frame; mapping the adaptation protocol frame into a virtual concatenation group comprising at least one 1 Gbps level Optical Channel Data Unit (ODU); multiplying the 1 Gbps level ODU in the virtual concatenation group into a higher order ODU; mapping the higher order ODU into a higher order Optical Channel Transport Unit (OTU); and outputting the higher order OTU to the OTN. Embodiments of the present invention improve the bandwidth utilization rate while implementing the transparent transporting of the LAN signal in the OTN.

28 Claims, 3 Drawing Sheets

METHOD AND APPARATUS FOR TRANSPORTING LOCAL AREA NETWORK SIGNALS IN OPTICAL TRANSPORT NETWORK

CROSS REFERENCE TO RELATED APPLICATIONS

This is a continuation of International Application No. PCT/CN2006/003577, filed on Dec. 25, 2006, which claims priority to Chinese Patent Application No. 200510137825.9, filed on Dec. 31, 2005.

FIELD OF THE INVENTION

The present invention relates to data transportation technologies in an Optical Transport Network (OTN), and more particularly, to methods and apparatuses for transporting Local Area Network (LAN) signal in an OTN.

BACKGROUND OF THE INVENTION

For the purpose of meeting requirements of increase in data services in future, an OTN is proposed, and the OTN integrates a capability of Operation, Administration, Maintenance and Provision (OAM&P), a transporting capability of a large-capacity and long-distance and a scheduling capability of a large-capacity.

Client services of the OTN include Constant Bit Rate (CBR) 2.5 G, CBR 10 G, CBR 40 G and General Framing Procedure (GFP). The OTN is able to provide transparent transportation for services with the above-mentioned CBR rates, and the transparence is mainly BIT transparence. When including LAN signals of Gigabyte Ethernet (GE) or 10 GE, the client signals are adapted to the OTN in a GFP protocol. The OTN is able to guarantee transparence on byte and frame of GFP signals as well as transparence on Media Access Control (MAC) frames of an Ethernet. The transparence on the MAC frames is a main requirement for transporting Ethernet data.

With the increase of data services and decrease of networking in such networks as Synchronous Digital Hierarchy (SDH) networks and Synchronous Optical Networks (SONETs), the Ethernet will be a primary data service in future. Two interfaces are defined in the Standard 802.ae of the Institution of Electrical and Electronics Engineers (IEEE). One is a 10 GE Wide Area Network (WAN) interface (10 Gbase-W) with a rate of OC-192/STM-64; the other is a 10 GE LAN interface (10 Gbase-R) using a 64B/66B coding. The 10 GE LAN interface, rather than the 10 G WAN interface, is adopted frequently in the interconnection of backbone routers or the interconnection of data switches because the cost of the 10 G WAN interface is high. Therefore, transporting 10 GE LAN services in the OTN is an important issue. The main problem in transporting the 10 GE LAN services in the OTN is that, the rate of a payload area in an Optical Channel Payload Unit 2 (OPU2) in the OTN is lower than the information rate of the 10 GE LAN service. In general, the information rate of the 10 GE LAN service is 10.0000±100 ppm Gbit/s, while the rate of the payload area in the OPU2 is 9.9953±20 ppm Gbit/s. Obviously, it is impossible to directly map the 10 GE LAN into the OPU2.

For the purpose of transporting the 10 GE LAN services in the OTN, some conventional technical solutions are proposed.

For example, with reference to FIG. 1, a 10 GE LAN signal is adapted via the GFP to a virtual concatenation signal with five OPU1s, i.e. OPU1-5V, and the virtual concatenation signals are transported in the OTN after being decoded by the 64B/66B decoding.

The disadvantage of the conventional method is that five OPU1s are needed. If a line rate is the rate of an Optical Channel Transport Unit 1 (OTU1), five color wavelengths are needed for transporting the five OPU1s. If the line rate is the rate of an OTU2, one OTU2 is used to transport four OPU1s, and one Optical Channel Data Unit (ODU1) in another OTU2 is used to transport the other OPU1. When a client wants to perform a bandwidth adjustment by taking one GE as a unit, because the rate of the OPU1 is 2.5 G, Link Capacity Adjustment Scheme (LCAS) is only able to perform the bandwidth adjustment by taking 2.5 G as a unit. The 2.5 G granularity in the conventional method is too large for the bandwidth adjustment wanted by the client. To sum up, the conventional method has a low efficiency and wastes bandwidth resources.

SUMMARY OF THE INVENTION

Embodiments of the present invention provide methods and apparatuses for transporting LAN signal in an OTN, in order to improve the bandwidth utilization rate, and meanwhile implement the transparent transportation of the LAN services in the OTN.

A method for transporting a LAN signal in an OTN includes:

mapping a LAN signal into an adaptation protocol frame;

mapping the adaptation protocol frame into a virtual concatenation group comprising at least one 1 Gbps level Optical Channel Data Unit, ODU; multiplying the at least one 1 Gbps level ODU in the virtual concatenation group into a higher order ODU;

mapping the higher order ODU into a higher order Optical Channel Transport Unit, OTU; and outputting the higher order OTU to an OTN.

A method for transporting a LAN signal in an OTN includes: de-mapping a higher order Optical Channel Transport Unit, OTU from the OTN into a higher order Optical Channel Data Unit, ODU;

de-multiplexing the higher order ODU into a virtual concatenation group comprising at least one 1 Gbps level ODU;

de-mapping the virtual concatenation group into an adaptation protocol frame; and de-mapping the adaptation protocol frame into a LAN signal.

An apparatus for transporting a LAN signal in an OTN includes:

an adaptation protocol frame mapping unit, capable of mapping a LAN signal into an adaptation protocol frame;

a virtual concatenation module, capable of mapping the adaptation protocol frame into a virtual concatenation group including at least one 1 Gbps level Optical Channel Data Unit, ODU; and a multiplying module, capable of multiplying the at least one of 1 Gbps level ODU in the virtual concatenation group into a higher order ODU, mapping the higher order ODU into a higher order Optical Channel Transport Unit, OTU, and outputting the higher order OTU to the OTN.

An apparatus for transporting a LAN signal in an OTN includes:

a multiplying module, capable of de-mapping a higher order Optical Channel Transport Unit, OTU from an OTN into a higher order Optical Channel Data Unit, ODU, and de-multiplexing the higher order ODU into a virtual concatenation group comprising at least one 1 Gbps level ODU;

a virtual concatenation module, capable of de-mapping the at least one of the 1 Gbps level ODU into an adaptation protocol frame; and an adaptation protocol frame module, capable of de-mapping the adaptation protocol frame into a LAN signal.

As can be seen from the above-mentioned description, the methods and the apparatuses for transporting a LAN signal in an OTN are provided by embodiments of the present invention. In the embodiments, the bandwidth of the LAN services is adjusted to 1 GE, the bandwidth utilization rate is improved, and meanwhile the transparent transportation of the LAN services is implemented and the line rate is kept unchanged. The method and the apparatus are compatible with the conventional OTN mechanism. The LCAS taking GE as a bandwidth unit and a network Terminal Multiplexer (TMUX) taking GE as a bandwidth unit are further implemented. A point-to-point transportation for the 10 GE LAN services or the transportation mixing the 10 GE LAN services with Time Divide Multiplex (TDM) services is implemented.

DETAILED DESCRIPTION OF THE INVENTION

Detailed descriptions of the present invention are provided as follows with reference to the accompanying drawings and specific embodiments.

Figure 1:
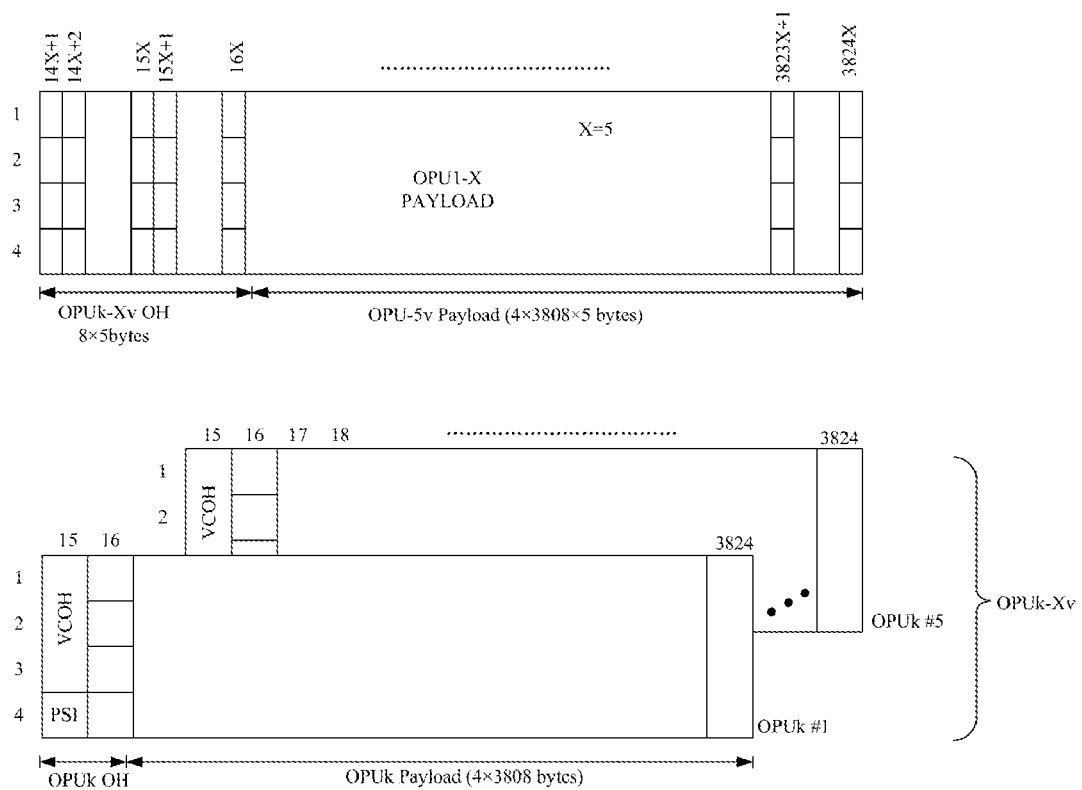
FIG. 1 is a schematic diagram illustrating a conventional procedure for adapting 10 GE LAN signals to an OPU1.
Figure 2:
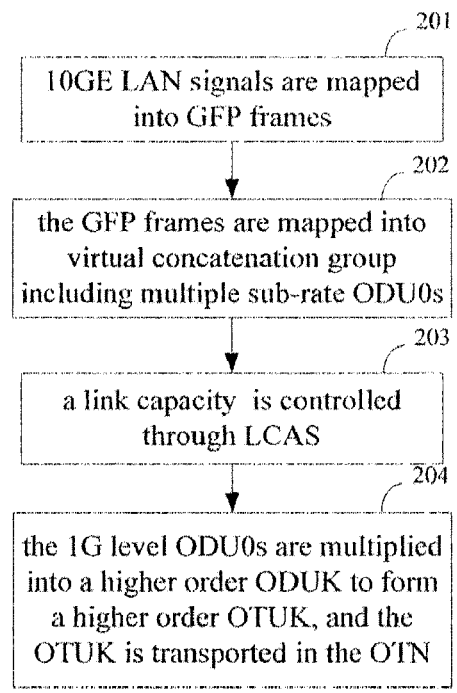
FIG. 2 is a flowchart illustrating a method for transporting 10 GE LAN signals in an OTN in accordance with an embodiment of the present invention.

With reference to FIG. 2, a method for transporting a LAN signal in an OTN is described as follows with 10 GE LAN signals as an example.

The line rate of the 10 GE LAN signals coded by the 64B/66B is 10 G×66/64=10.3125 GBIT/S±100 ppm while the information rate of the 10 GE LAN signals decoded by the 64B/66B is 10 G BIT/S±100 ppm. The 64B/66B includes control information.

At block 201, the 10 GE LAN signals are mapped into GFP frames. The detailed mapping procedure includes: decoding the 10 GE LAN signals by the 64B/66B, extracting MAC frames and encapsulating the MAC frames extracted into the GFP frames.

The GFP encapsulation includes a Transparent GFP (GFP-T) encapsulation and a Framing map GFP (GFP-F) encapsulation. When the MAC frames are extracted, extracted contents include MAC information and control information.

For example, in the GFP-T encapsulation, there are two modes for mapping the 10 GE LAN signals into the GFP frames. One of the two modes referred to as frame mapping is to directly extract the MAC frames from the 10 GE LAN signals and encapsulate the MAC frames into the GFP frames which needs to first decode the 10 GE LAN signals by the 64B/66B while removing Inter-Packet Gaps (IPGs), i.e. Ethernet IPGs. The other is to decode the 10 GE LAN signals by the 64B/66B to get 10 GE signals, and code the 10 GE signals into GFP frames which are applicable to the GFP-T encapsulation in a block coding mode.

The above-mentioned descriptions are only dedicated the GFP frames. The 10 GE LAN signals may also be adapted to other adaptation protocol frames such as LAPS frames and High-Level Data Link Control (HDLC) frames according to practical situations.

At block 202, the GFP frames are mapped into virtual concatenation group which includes multiple sub-rate Optical Channel Data Units (ODU0s).

The sub-rate generally refers to a 1 G level sub-rate. In an embodiment of the present invention, a 1 Gbps level ODU0 is defined for 1 Gbps level low rate services such as a GE and a Fiber Connectivity (FC) according to the International Telecommunications Union—Telecommunication Standardization Sector (ITU-T) G.709 recommendation. A payload unit of the ODU0 is an OPU0, i.e., 1 Gbps level optical channel payload unit.

Figure 3:
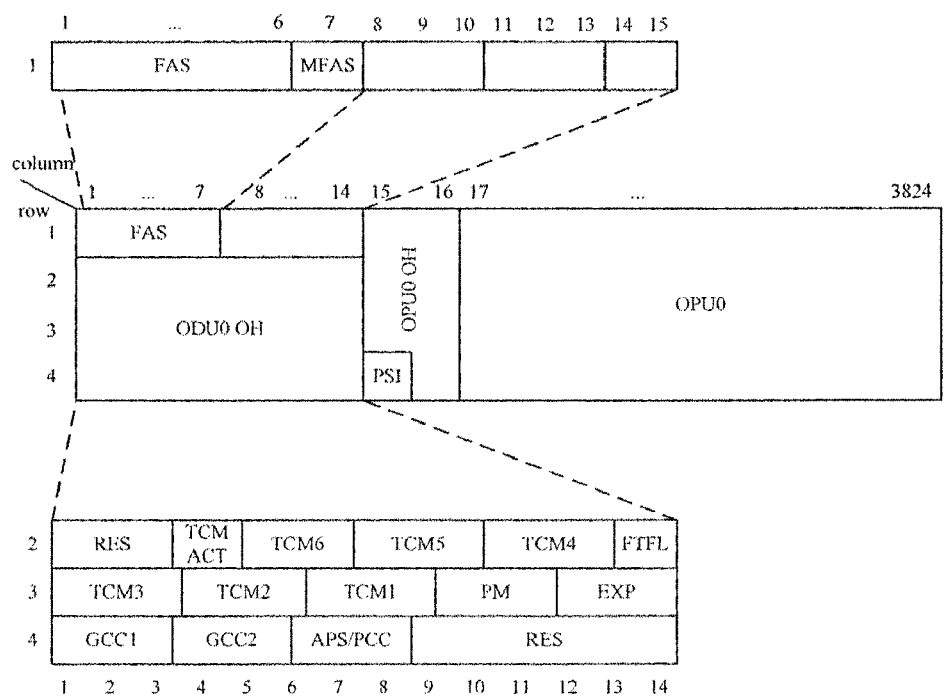
FIG. 3 is a schematic diagram illustrating a frame format of an ODU0 in accordance with another embodiment of the present invention.

FIG. 3 shows a frame format of an ODU0 in accordance with another embodiment of the present invention. The 2nd to 4th rows of the first 14 columns belong to a data unit management overhead (ODU0 OH) of the ODU0, the 15th and 16th rows belong to a payload management overhead (OPU0 OH), 3808 columns stalling from the 17th column belong to a payload area (OPU0), and the last columns belong to a Forward Error Correction (FEC). In the embodiment of the present invention, the definition of each byte of the ODU0 OH is the same as that of an ODU OH defined by a digital wrapper technology. Thus there is an end-to-end management overhead for 1 Gbps level services to implement end-to-end performance management for services such as the GE. With reference to the ITU-T G.709 recommendation, the 1st rows of the 1st to 7th columns include Frame Alignment Signal (FAS) bytes, and the 1st line of the 7th column includes MFAS bytes indicating a frame number corresponding to the overhead bytes when multiple frames are carried. The OPU0 OH on the 4th row of the 15th column includes PSI bytes, and 255 multiplex bytes including a PT byte and reserved bytes, which correspond to the value of Multi-frame Alignment Signal (MFAS) ranging from 0 to 255 respectively.

The ODU0 is defined on the basis of the ITU-T G.709 recommendation, therefore, the structure of the ODU0 complies with the recommendation and is similar to that of an ODUK (K=1, 2, 3). The major difference between the ODU0 and the ODUK is that the rate level of the ODU0 meets the requirement of low rate services. In the embodiment, the bit rate of the ODU0 is (STM-16 rate)/2±20 ppm-1244160 Kbps±20 ppm, and a capacity of the ODU0 is 4×3824 bytes; the OPU0, i.e. payload area of the ODU0, is 4×3810 bytes.

A payload area of the sub-rate OPU0 is 4×3808 bytes, a bit rate corresponding to the sub-rate OPU0 is (3808/3824)×(1244160±20 ppm)=(238/239)×(1244160±20 ppm)=1238954.31 Kbps±20 ppm. It needs a capacity of nine payload areas of the sub-rate OPU0, i.e. 9×1238954.31 Kbps±20 ppm=11150588.79 Kbps±20 ppm, to completely transport MAC frames of the 10 GE LAN. The transparent transmission for the MAC frames of the 10 GE maybe completely implemented because the total capacity of one virtual concatenation group is larger than 10 GE.

The ODU0 or the OPU0 may transport management frames of the GFP as required, so as to guarantee the implementation of the separate GFP transmission, management and maintenance for each low rate service. When the GFP frames are mapped and filled into the payload areas of the ODU0 or OPU0, a number of IDLE frames may be inserted in accordance with the GFP mapping method, so that a total rate of the GPF signals and the IDLE frames equals the rate of the payload area of the OPU0. The method for inserting IDLE (tames can be found in ITU-T G.709 recommendation.

At block 203, a link capacity is controlled through the LCAS.

The LCAS is configured by a network manager to ensure the link capacity meets the capacity requirement of the client. For example, although the port rate of the 10 GE LAN of the client is at 10 G level, only a bandwidth of 5 GE needs to be provided when the traffic is low, and the link capacity may be adjusted to ODU0-5V through the LCAS. The link capacity may be adjusted in a range from 1×ODU0 to 9×ODU0 through the LCAS.

Apart from configuring the LCAS by the network manager, a traffic monitoring apparatus may be configured to monitor traffic of the MAC frames of the 10 GE LAN and report to the network manager. The network manager automatically configures the LCAS according to the current traffic information, so that the capacity of the ODU0-XV is just applicable to the current traffic of the 10 GE LAN to be transferred.

At block 204, the 1 G level ODU0s are multiplied into a higher order ODUK to form a higher order OTUK, and the OTUK is transported in the OTN.

The multiplication is performed according to an allocated link bandwidth (refers to the capacity in general) controlled through the LCAS. The signals to be multiplied may be solely the ODU0s obtained from the above processes for implementing the multiplying from the X×ODU0 into the OTUK (K=1, 2, 3). For example, two ODU0s are multiplied into one ODU1; eight ODU0s are multiplied into one ODU2 and thirty two ODU0s are multiplied into one ODU3. The signals to be multiplied may be a mixture of all the ODU0s in the virtual concatenation group and signals from other links or a mixture of part of the ODU0s in the virtual concatenation group and signals from other links. For example, a hybrid multiplying is implemented from X×ODU0 and Y×ODUJ to an ODUK or an OTUK, wherein J=0, 1, 2; K=1, 2, 3; K>J. Obviously, signals from even more links may also be multiplied together.

Figure 4:
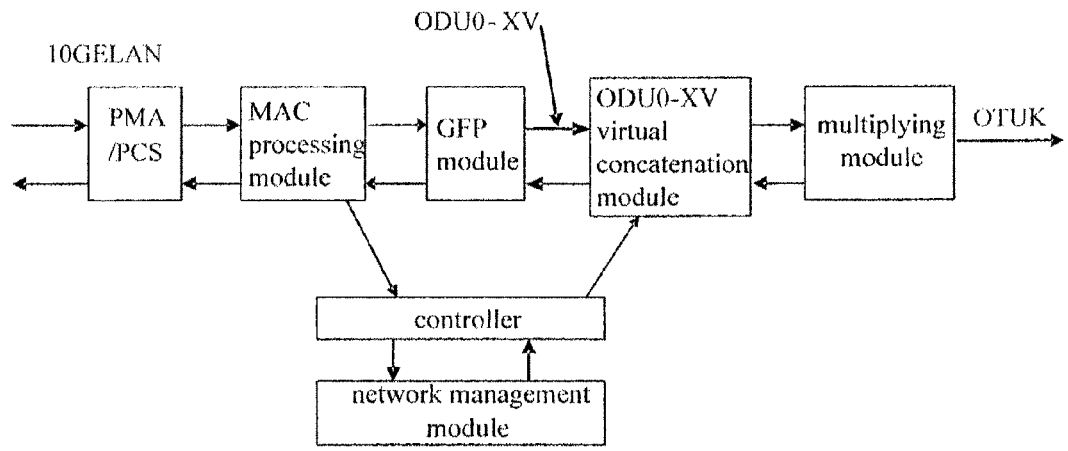
FIG. 4 is a schematic diagram illustrating a structure of an apparatus for transporting 10 GE LAN signal in an OTN in accordance with another embodiment of the present invention.

FIG. 4 shows an apparatus for transporting a 10 GE LAN signal in an OTN in accordance with another embodiment of the present invention. The apparatus includes: a GFP frame mapping unit, an ODU0-XV virtual concatenation module, a multiplying module and a control and management unit. The GFP frame mapping unit includes a physical interface module, an MAC processing module and a GFP module. The control and management unit includes a controller and a network management module. The function of each module is respectively described as follows in detail.

The physical interface module (PMA/PCS) codes and decodes the 10 GE LAN signals, especially codes and decodes by a 64B/66B coding and decoding.

In the sending direction, the MAC processing module receives signals from the physical interface module and extracts MAC frames. The MAC processing module may further monitors traffic of the MAC frames and sends a traffic monitoring result to the controller. In the receiving direction, the MAC processing module receives MAC frames from the GFP module, and converts the MAC frames to signals that need to be processed by the physical interface module.

In the sending direction, the GFP module receives the MAC frames sent by the MAC processing module, inserts IDLE frames as required and encapsulates the MAC frames and IDLE frames into GFP frames. In the receiving direction, the GFP module removes IDLE frames from the GFP frames sent by the ODU0-XV virtual concatenation module, restores the GFP frames to MAC frames, and sends the MAC frames to the MAC processing module.

In the sending direction, the ODU0-XV virtual concatenation module maps the GFP frames sent by the GFP module into an ODU0-XV signal. The ODU0-XV virtual concatenation module may further include an LCAS function for determining a link capacity according to configuration of network manager. In the receiving direction, the ODU0-XV virtual concatenation module receives virtual concatenation group which includes 1 Gbps level ODUs sent by the multiplying module, and de-maps the received virtual concatenation group into GFP frames.

In the sending direction, the multiplying module multiplies X×ODU0s into an ODUK, multiplies the X×ODU0s and Y×ODUJs into an ODUK, or even multiplies the ODU0s and multiple links of ODU signals on multiply links into an ODUK, and maps the signals multiplied into OTUK and outputs the OTUK in which J=0, 1, 2; K>J. In the receiving direction, the multiplying module receives OTUK from the OTN, de-maps the OTUK into ODUKs, and de-multiplexes the ODUK.

If the MAC processing module monitors traffic of the MAC frames, the controller collects or receives a result of monitoring the MAC traffic from the MAC processing module, and sends the result of monitoring the MAC traffic to the network management module. The network management module computes the optimal link capacity of the ODU-XV according to the received result of monitoring the MAC traffic, initiates LCAS, generates a link capacity adjustment value and sends the link capacity adjustment value to the controller. The controller generates a capacity control command according to the link capacity adjustment value and sends the capacity control command to the virtual concatenation module. The virtual concatenation module configures the capacity of the link between itself and the multiplying module according to the capacity control command.

If the MAC processing module has no MAC traffic monitoring function, the network management module initiates the LCAS, generates a link capacity adjustment value according to a link capacity configured manually and sends the link capacity adjustment value to the controller. The controller generates a capacity control command according to the link capacity adjustment value and sends the capacity control command to the virtual concatenation module. The virtual concatenation module configures the capacity of the link between itself and the multiplying module according to the capacity control command.

The controller and the network management module may be configured in one physical entity.

Figure 5:
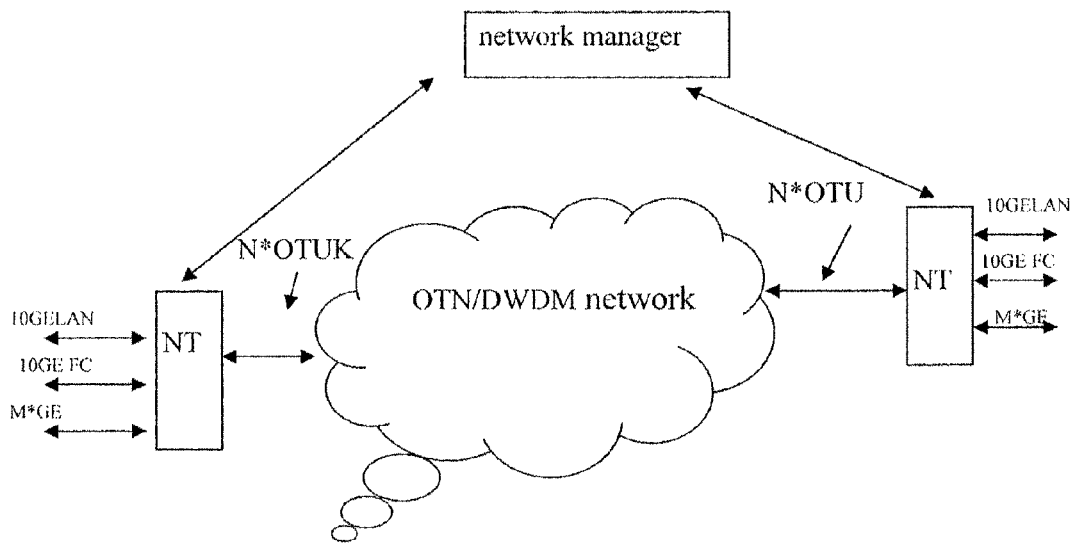
FIG. 5 is a schematic diagram illustrating an apparatus for implementing the OTN or Dense Wavelength Division Multiplex (DWDM) terminal multiplexer in accordance with another embodiment of the present invention.

With reference to FIG. 5, the above-mentioned apparatus in accordance with the embodiment of the present invention may be configured in an OTN terminal for implementing an OTN terminal multiplexer or configured in a DWDM terminal for implementing a DWDM terminal multiplexer. A service convergence of multiple signals including 10 GE LAN signals and 10 GE FC signals is implemented by configuration of multiple the apparatuses in one terminal multiplexer, and the point-to-point transportation in the OTN network is implemented.

The transparent transportation of the 10 GE LAN service with an adjustable bandwidth may be implemented according to the embodiments of the present invention, and the adjustment granularity is 1 GE. For example, if a client of the 10 GE LAN only needs five GE bandwidths, the LCAS is configured to obtain a capacity of an ODU0-5V; if the client of the 10 GE LAN needs to transport 10 GE LAN signals in a full rate, the LCAS is configured to obtain a capacity of ODU0-9V, in which eight ODU0s occupy one OTU2, and the other ODU0 is transported via the other OTU2. The reset capacity of the OTU2 may be used for transporting other ODU1 or ODU0 signals which are multiplexed into the OTU2 together with the ODU0. Therefore, the total line capacity is saved.

It is known by those skilled in the art that the solution of the embodiments of the present invention may also be applicable to the LAN signals of other rates apart from 10 GE LAN signals.

The above are only preferred embodiments of the present invention and are not for use in limiting the present invention. Any modification, equivalent replacement or improvement made under the principles of the present invention is included in the protection scope of the present invention.

The invention claimed is:

1. A method for transporting a Local Area Network, LAN, signal in an Optical Transport Network, OTN, comprising:
    mapping a LAN signal into an adaptation protocol frame;
    mapping the adaptation protocol frame into a virtual concatenation group comprising at least one 1 Gbps level Optical Channel Data Unit, ODU;
    multiplexing the at least one 1 Gbps level ODU in the virtual concatenation group into a higher order ODU;
    mapping the higher order ODU into a higher order Optical Channel Transport Unit, OTU; and
    outputting the higher order OTU to an OTN.

2. The method of claim 1, wherein the LAN signal comprises a 10 GE LAN signal, and the virtual concatenation group corresponding to the LAN signal comprises nine 1 Gbps level ODUs.

3. The method of claim 1, wherein the multiplexing the at least one 1 Gbps level ODU in the virtual concatenation group into a higher order ODU comprises:
    multiplexing the at least one 1 Gbps level ODU solely into the higher order ODU.

4. The method of claim 1, wherein the quantity of the 1 Gbps level ODU multiplexed into the higher order ODU is controlled through Link Capacity Adjustment Scheme, LCAS.

5. The method of claim 4, further comprising:
    configuring the LCAS in advance.

6. The method of claim 5, wherein the adaptation protocol frame comprises at least one of a General Framing Procedure, GFP, frame, a Link Capacity Adjustment Scheme, LAPS, frame and a High-Level Data Link Control, HDLC, frame.

7. A method for transporting a Local Area Network, LAN, signal in an Optical Transport Network, OTN, comprising:
    de-mapping a higher order Optical Channel Transport Unit, OTU from the OTN into a higher order Optical Channel Data Unit, ODU;
    de-multiplexing the higher order ODU into a virtual concatenation group comprising at least one 1 Gbps level ODU;
    de-mapping the virtual concatenation group into an adaptation protocol frame; and
    de-mapping the adaptation protocol frame into a LAN signal.

8. An apparatus for transporting a Local Area Network, LAN, signal in an Optical Transport Network, OTN, comprising:
    an adaptation protocol frame mapping unit, capable of mapping a LAN signal into an adaptation protocol frame;
    a virtual concatenation module, capable of mapping the adaptation protocol frame into a virtual concatenation group comprising at least one 1 Gbps level Optical Channel Data Unit, ODU; and
    a multiplexing module, capable of multiplexing the at least one of 1 Gbps level ODU in the virtual concatenation group into a higher order ODU, mapping the higher order ODU into a higher order Optical Channel Transport Unit, OTU, and outputting the higher order OTU to the OTN.

9. The apparatus of claim 8, wherein the multiplexing module further comprises a submodule for controlling a quantity of the 1 Gbps level ODU multiplied into the higher order ODU through Link Capacity Adjustment Scheme, LCAS.

10. The apparatus of claim 9, wherein the multiplexing module further comprises a submodule for configuring the LCAS in advance or configuring dynamically according to current traffic of the LAN signals.

11. The apparatus of claim 10, further comprising:
    a first controller, capable of collecting or receiving a result of monitoring traffic;
    a first network management module, capable of computing an optimal link capacity according to the result of monitoring the traffic sent from the first controller, initiating LCAS, generating a link capacity adjustment value, and sending the link capacity adjustment value to the first controller; wherein the first controller generates a capacity control command according to the link capacity adjustment value;
    the adaptation protocol frame mapping unit monitors the traffic and sends the result of monitoring the traffic to the first controller; and
    the virtual concatenation module configures the link capacity between itself and the multiplexing module according to the capacity control command sent form the first controller.

12. The apparatus of claim 10, further comprising:
    a second network management module, capable of initiating LCAS, generating a link capacity adjustment value according to a preconfigured link capacity;
    a second controller, capable of generating a capacity control command according to the link capacity adjustment value;
    wherein the virtual concatenation module is further capable of configuring the link capacity between itself and the multiplexing module according to the capacity control command sent form the second controller.

13. An apparatus for transporting a Local Area Network, LAN, signal in an Optical Transport Network, OTN, comprising:
    a multiplexing module, capable of de-mapping a higher order Optical Channel Transport Unit, OTU from an OTN into a higher order Optical Channel Data Unit, ODU, and de-multiplexing the higher order ODU into a virtual concatenation group comprising at least one 1 Gbps level ODU;
    a virtual concatenation module, capable of de-mapping the at least one of the 1 Gbps level ODU into an adaptation protocol frame; and
    an adaptation protocol frame module, capable of de-mapping the adaptation protocol frame into a LAN signal.

14. The method of claim 1, wherein multiplexing the at least one 1 Gbps level ODU in the virtual concatenation group into a higher order ODU comprises multiplexing the at least one 1 Gbps level ODU and other signals in the OTN into the higher order ODU.

15. The method of claim 4, further comprising configuring the LCAS dynamically according to current traffic of the LAN signals.

16. A method for transporting a Local Area Network (LAN) signal in an Optical Transport Network (OTN), the method comprising:
- mapping a LAN signal into an adaptation protocol frame, wherein the rate of the LAN signal is higher than 1 Gbps;
- mapping the adaptation protocol frame into a virtual concatenation group comprising more than one 1Gbps level Optical Channel Data Unit (ODU);
- multiplexing at least one of the 1 Gbps level ODUs in the virtual concatenation group into a higher order ODU, wherein the quantity of the 1 Gbps level ODU in the virtual concatenation group multiplexed into the higher order ODU is controlled through Link Capacity Adjustment Scheme(LCAS);
- mapping the higher order ODU into a higher order Optical Channel Transport Unit (OTU); and
- outputting the higher order OTU to an OTN.

17. The method of claim 16, wherein the LAN signal comprises a 10 GE LAN signal, and the virtual concatenation group corresponding to the LAN signal comprises nine 1 Gbps level ODUs.

18. The method of claim 16, wherein the multiplexing at least one of the 1 Gbps level ODUs in the virtual concatenation group into a higher order ODU comprises multiplexing at least one of the 1 Gbps level ODU solely into the higher order ODU.

19. The method of claim 16, wherein the multiplexing at least one of the 1 Gbps level ODUs in the virtual concatenation group into a higher order ODU comprises multiplexing at least one of the 1 Gbps level ODU and other signals in the OTN into the higher order ODU.

20. The method of claim 16, further comprising configuring the LCAS in advance.

21. The method of claim 16, further comprising configuring the LCAS dynamically according to current traffic of the LAN signals.

22. The method of claim 21, wherein the adaptation protocol frame comprises at least one of a General Framing Procedure frame, a Link Capacity Adjustment Scheme frame and a High-Level Data Link Control frame.

23. A method for transporting a Local Area Network (LAN) signal in an Optical Transport Network (OTN), the method comprising:
- de-mapping a higher order Optical Channel Transport Unit (OUT) from the OTN into a higher order Optical Channel Data Unit (ODU);
- de-multiplexing the higher order ODU into a virtual concatenation group comprising more than one 1 Gbps level ODU;
- de-mapping the virtual concatenation group into an adaptation protocol frame; and
- de-mapping the adaptation protocol frame into a LAN signal ,wherein the rate of the LAN signal is higher than 1 Gbps.

24. An apparatus for transporting a Local Area Network (LAN) signal in an Optical Transport Network (OTN), the apparatus comprising:
- an adaptation protocol frame mapping unit, capable of mapping a LAN signal into an adaptation protocol frame, wherein the rate of the LAN signal is higher than 1 Gbps;
- a virtual concatenation module, capable of mapping the adaptation protocol frame into a virtual concatenation group comprising more than one 1 Gbps level Optical Channel Data Unit, ODU; and
- a multiplexing module, capable of multiplexing the at least one of the 1 Gbps level ODUs in the virtual concatenation group into a higher order ODU, mapping the higher order ODU into a higher order Optical Channel Transport Unit, OTU, and outputting the higher order OTU to the OTN, wherein the quantity of the 1 Gbps level ODU in the virtual concatenation group multiplexed into the higher order ODU is controlled through Link Capacity Adjustment Scheme (LCAS).

25. The apparatus of claim 24, wherein the multiplexing module further comprises a submodule for configuring the LCAS in advance or configuring dynamically according to current traffic of the LAN signals.

26. The apparatus of claim 25, further comprising:
- a first controller, capable of collecting or receiving a result of monitoring traffic;
- a first network management module, capable of computing an optimal link capacity according to the result of monitoring the traffic sent from the first controller, initiating LCAS, generating a link capacity adjustment value, and sending the link capacity adjustment value to the first controller; wherein the first controller generates a capacity control command according to the link capacity adjustment value;
- the adaptation protocol frame mapping unit monitors the traffic and sends the result of monitoring the traffic to the first controller; and
- the virtual concatenation module configures the link capacity between itself and the multiplexing module according to the capacity control command sent form the first controller.

27. The apparatus of claim 25, further comprising:
- a second network management module, capable of initiating LCAS, generating a link capacity adjustment value according to a preconfigured link capacity; and
- a second controller, capable of generating a capacity control command according to the link capacity adjustment value;
- wherein the virtual concatenation module is further capable of configuring the link capacity between itself and the multiplexing module according to the capacity control command sent form the second controller.

28. An apparatus for transporting a Local Area Network, LAN, signal in an Optical Transport Network, OTN, comprising:
- a multiplexing module, capable of de-mapping a higher order Optical Channel Transport Unit (OUT) from an OTN into a higher order Optical Channel Data Unit (ODU) and de-multiplexing the higher order ODU into a virtual concatenation group comprising more than one 1 Gbps level ODU;
- a virtual concatenation module, capable of de-mapping the virtual concatenation group into an adaptation protocol frame; and
- an adaptation protocol frame module, capable of de-mapping the adaptation protocol frame into a LAN signal ,wherein the rate of the LAN signal is higher than 1 Gbps.

* * * * *